Nov. 5, 1957       H. G. JONES       2,811,935
FABRICATED SHEET METAL TRAILER AWNING
Filed Feb. 15, 1954       3 Sheets-Sheet 1
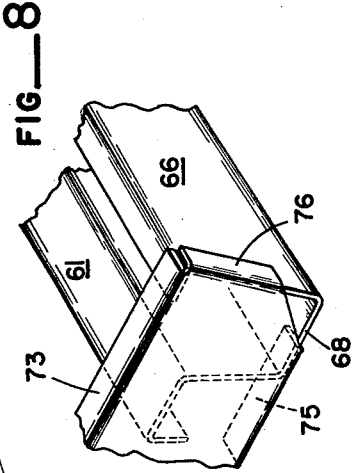
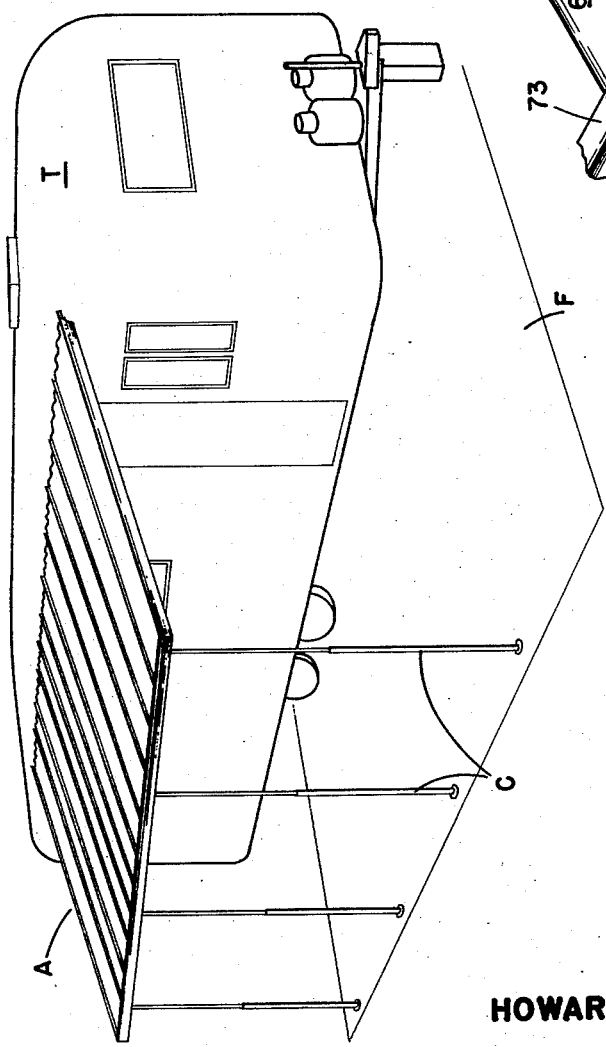
HOWARD  G.  JONES
INVENTOR
BY
*Smith & Tuck*

Nov. 5, 1957        H. G. JONES        2,811,935
FABRICATED SHEET METAL TRAILER AWNING
Filed Feb. 15, 1954        3 Sheets-Sheet 2
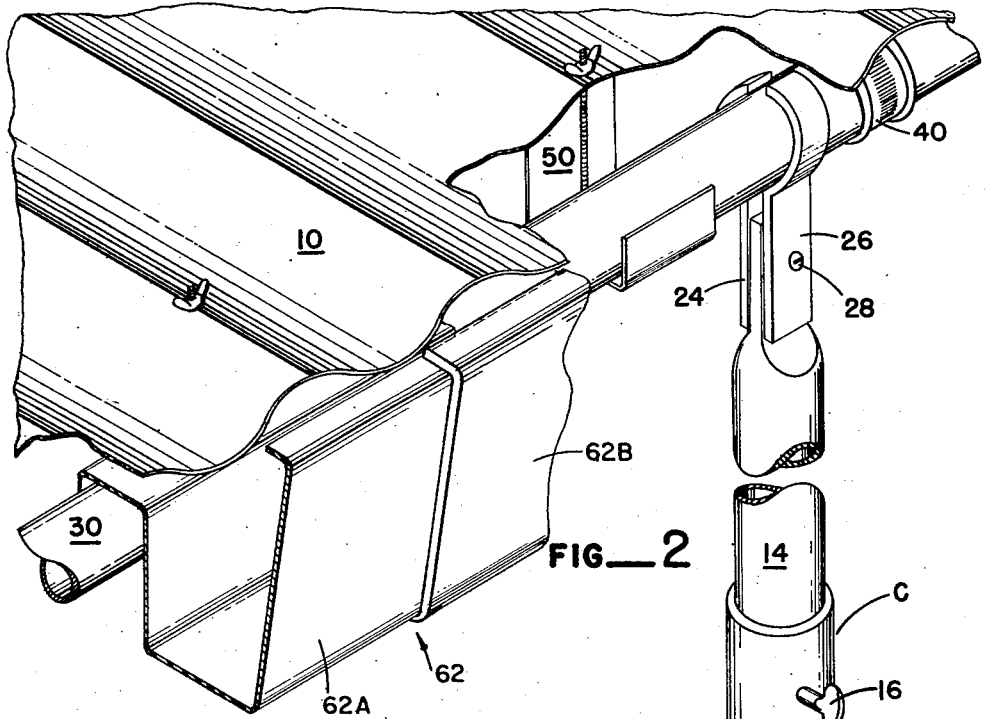
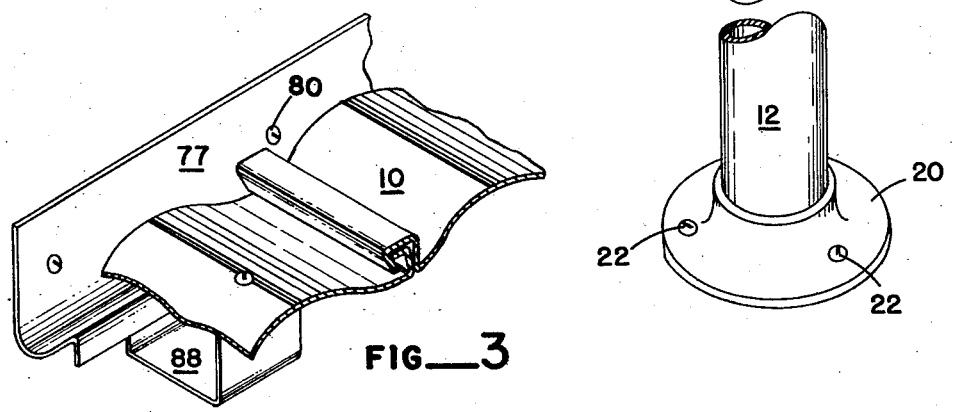
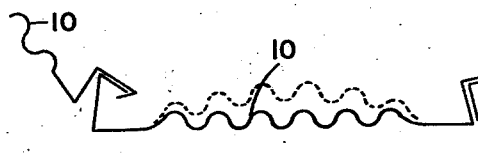
HOWARD G. JONES
INVENTOR
BY Smith & Tuck

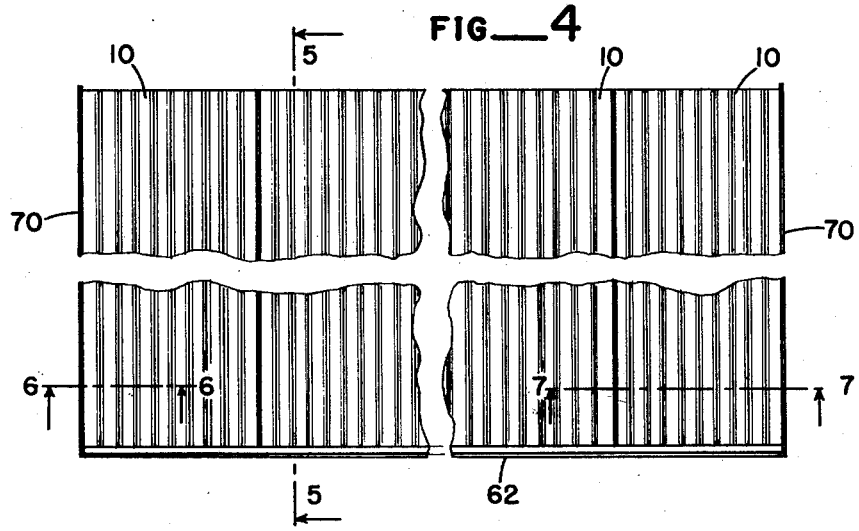
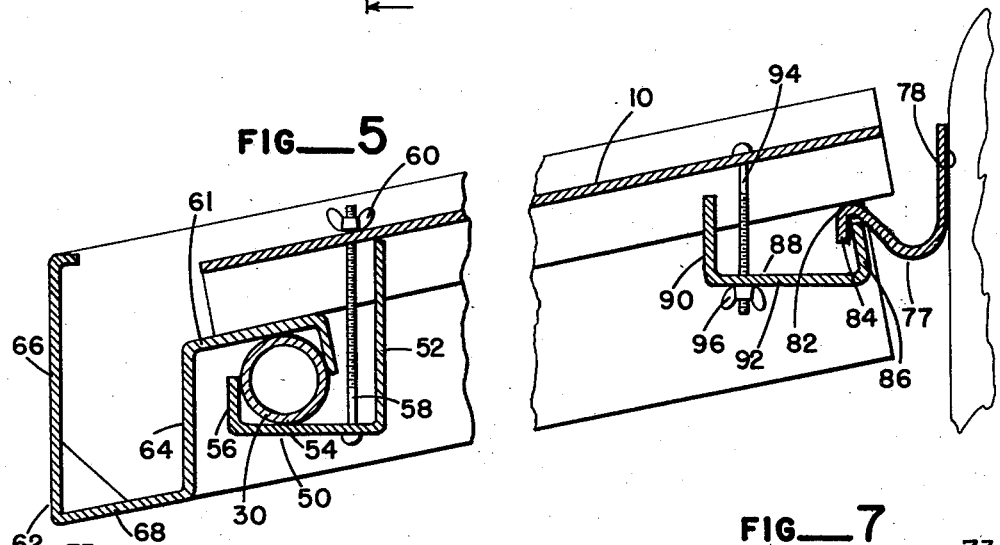
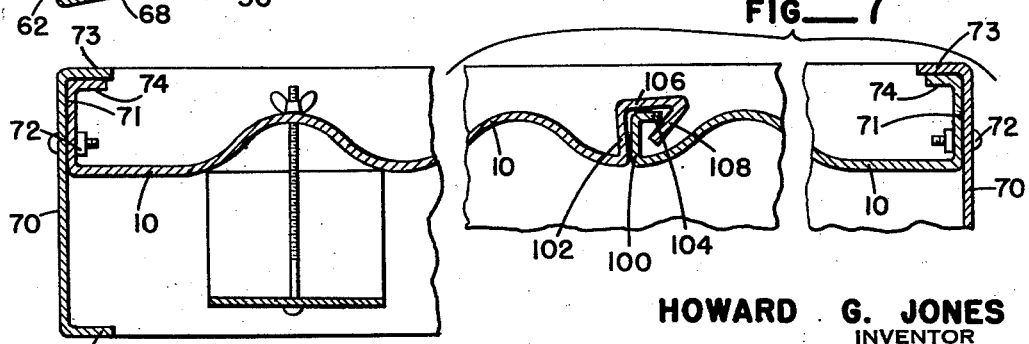

United States Patent Office 2,811,935
Patented Nov. 5, 1957

2,811,935
FABRICATED SHEET METAL TRAILER AWNING

Howard G. Jones, Seattle, Wash., assignor to Mobile Shade Company, Inc., Seattle, Wash., a corporation of Washington Application February 15, 1954, Serial No. 410,297

10 Claims. (Cl. 108—3)

My invention relates to an awning, fabricated from sheet metal sections and other demountable parts, which is especially adapted for trailers. The awning is designed for disassembly to form a minimum sized package during transportation of the trailer. When assembled the parts form a sturdy awning of beauty, simplicity, and low cost.

A significant portion of the population of the United States lives in trailers. The trailers are commonly parked for considerable periods of time in the so-called "trailer parks." An awning for the entrance side of the trailer is an important accessory, particularly when the trailer is established in a trailer park for a considerable period. The trailer park usually provides a cement or other floor for this side of the trailer and the awning may be more or less co-extensive with this floor. The awning in effect adds room to the trailer in providing a covered patio for dining and other living activities. The trailer parks are particularly common in the southern parts of the country where there is need for shade a large part of the year. The awning not only shades the outside floor but also protects the door side of the trailer from direct heat. Furthermore, the awning serves a purpose in the northern climates where it may be quite warm in the summer and where protection to the door area from rain and snow is desired in the winter. At times it may be desirable to use the covered area as a car port.

Canvas awnings have been used on trailers before my invention and it is believed that sheet metal awnings may be sold at reasonable prices and have considerable advantages over canvas awnings. For example, an aluminum awning is of light weight, will have a better appearance over a period of years than the canvas awning and will outlast the canvas by many years. Furthermore corrugated aluminum sheets have considerable rigidity to help support the awning whereas the canvas is completely flexible. Aluminum sheets give superior wind resistance.

The objectives of my invention include, therefore: to devise an improved awning for house trailers; to provide such an awning of modular sheet metal construction; to devise an all-metal awning capable of disassembly for transportation in a minimum size, including disassembly of sheet metal roof sections and of supporting columns and the like; to provide such a metal awning with minimum weight, with attractive appearance, economical construction, and yet easily demountable construction.

My invention, together with additional objectives and advantages thereof, will be best understood from the following description, when read with reference to the drawings, in which:

Figure 1 is a perspective view of a trailer with a specific embodiment of the awning of my invention installed thereon;

Figure 2 is a perspective view, with certain portions broken away and shown in section to better reveal the construction, showing the forward edge of the awning on an enlarged scale;

Figure 3 is a similar view of the rear edge of the awning;

Figure 4 is a plan view of the awning, in fragmentary form;

Figure 5 is an enlarged sectional view taken on line 5—5 of Figure 4;

Figure 6 is a similar view taken on line 6—6 of Figure 4; and

Figure 7 is a similar view taken on line 7—7 of Figure 4;

Figure 8 is a perspective view showing the juncture between the end valance and the gutter of my awning; and Figure 9 is a diagrammatic view illustrating the hinged joining of the sheets and the manner in which they are bowed upwardly, transversely.

Figure 1 shows a trailer T of conventional construction as it appears when parked beside a cement floor F found in many trailer courts. The awning A is supported at its rear edge by trailer T and is supported at its forward edge by its own supporting columns C. The covering of floor F by the awning adds to the effective living area of the trailer T during temperate weather, and protects the trailer door, or may serve as a car port, during inclement weather.

The roof of awning A is formed by a series of sheet metal sections 10, each of which is preferably about two feet wide and 7 to 10 feet long. This and the other structure is provided in modular units not only for minimizing storage space when it is taken down but also so that an awning can be formed of a few sheets 10 and additional sections added at a later time. It is preferred that sheets 10 be formed of aluminum corrugated sheets because the aluminum is light weight and does not substantially deteriorate in use and the corrugations add considerable rigidity to the sheet, especially giving increased vertical strength.

The supporting means for the forward edge of the roof includes a plurality of standards or columns C formed with a lower tubular section 12, an upper tubular section 14 telescoping into tube 12, and a set screw 16 locking upper tube 14 in position. The lower end of tube 12 is positioned in a collar type base 20, which may be secured as by screws 22 to floor F. The floor level or other ground surface may be irregular and the standard is extensible to accommodate such irregularity. It is also often desirable to change the slope of the awning to meet varying climatic conditions as sun, wind, rain, or snow. The upper end of upper tube 14 is flattened and may be curved to form one clamp member for association with a bolted on clamp member or preferably a pair of clamping members 24, 26, is secured to opposite sides of a straight flattened portion of tube 14 by bolt 28, which may have a winged nut for manual tightening of the clamp.

A substantially horizontal tube or rod 30 extends under the forward edge of the roof and is supported by the standard and clamped by the upper curved ends of clamp members 24, 26. Horizontal tube 30 is fabricated normally in about two-foot modules, with maximum length not to exceed the length of sheets 10, and joined as by ferrule 40.

Each sheet 10 is tied to horizontal tube 30 at a plurality of locations by clips 50. Each clip 50 has a long upright wall 52, a horizontal intermediate wall 54 and a short upright wall 56. Horizontal wall 54 is tied to sheet 10 by means of a tension bolt 58 having a winged nut 60 at its upper end to press the upper edge of the longer upright wall 52 against the under surface of sheet 10. Horizontal tube 30 is positioned on horizontal wall 54 between short wall 56 and bolt 58 and the bolt acts to tighten the clip until the tube 30 is pressed against the under surface of sheet 10.

A securing flange 61 of the gutter 62 is positioned intermediate tube 30 and sheet 10 whereby the gutter is also secured in place by tension bolt 58. Gutter 62 has a short depending flange on the inner edge of securing flange 61 to prevent outward movement of the gutter. At the outer edge of securing flange 61 is a longer depending wall 64 and a trough is formed by wall 64, an outer face wall 66 and the intermediate wall 68.

It is desirable to form gutters 62 in module lengths, as 62A, 62B, and to have the sections slightly tapered, in the trough portion, to permit of telescoping the junctures between lengths. This arrangement assures a strong gutter assembly and the proper guidance of water, without leakage.

Each of the sloping side edges of the roof is protected by a channel member of valance 70, secured by bolts 72 intermediate its flanges, to edge walls 71 on the end sheets 10.

It is desired to point out that these edge walls 71 constitute the one departure from a complete interchangeability of parts in this awning structure. This, while not essential, has been found desirable in order to provide a more secure joining between the valance and sheets 10 than adapted clips would admit of.

Owing to the light gauge of the sheet aluminum, which is most desirable for this construction, it is especially desirable to take fullest advantage of the framing supplied by gutter 62 and the end valances 70. As shown in Figures 6 and 7 the inturned margins of valances 70 add considerable stiffness and this is best transferred to sheets 10 by having the upper margin 73 rest, throughout its length, on the inturned margin 74 of sheets 10. In a like manner the lower end of the valance is provided with inturned margins as 75 and 76 so as to more intimately engage the strong beam formed by gutter 62 and tubes 30 which are secured thereto.

The rear edge of the roof may be attached to any one of the cloth awning rails or gutters commonly used with trailers. However it has been found that the best results can be obtained with my new type of trailer awning rail 77 which has a back wall 78 joined to the side wall of trailer T as by self threading screws or bolts 80. The rail forms a reverse bend from back wall 78 and terminates in a forward angular grooved margin 82. A short wall 84 forms the face of this rail and also provides a recess between it and the next adjacent wall in which may be positioned at various angles, the rear short vertical wall 86 of a rear clip 88. Clip 88 is somewhat similar to clip 50 and has a forward vertical wall 90 joining wall 86 by the horizontal base 92. A tension bolt 94 ties base 92 to sheet 10 and in this case it is preferred to put the winged nut 96 on the bottom for handy access from below in installing the awning. Tension bolt 94 presses the upper edge of short vertical wall 86 against rail 77 and the curved forward edge 82 of this rail is pressed against the under surface of sheet 10. The upper edge of vertical wall 90 is pressed against the under surface of sheet 10. Clips 50 and 88 are similar to the extent that they have a width sufficient so that their upper corners will engage sheets 10 on opposite sides of a corrugation but not quite span the same.

Adjacent sheets 10 are secured together by having on each, one edge with a vertical upstanding wall 100 and having on its other edge a companion upright wall 102 that is preferably bent back from the vertical slightly. Wall 100 has a top flange 104 extending away from wall 102 of the adjacent sheet and upright wall 102 has a longer horizontal flange 106 overlying the first-mentioned flange 104 and terminating in a descending wall 108 forming a bend to receive the distal edge of flange 104. This structure resiliently holds adjacent sheets 10 together, the parts being proportioned so that some small pressure is necessary to force companion sheets 10 down to true horizontal alignment and this may be considered a hinged type of joinder. The technique of joining the abutting sheets 10 is illustrated, diagrammatically, in Figure 9. It will be noted that the sheets are horizontally disposed normally, as shown in solid lines, but when joned are somewhat bowed, transversely, as shown in dotted lines, somewhat exaggerated for illustration, due to a turning moment tensing the upper surfaces of sheets 10 applied by having the lower edges of upright walls 100 and 102 pressed against each other and having the upper edges of walls 100 and 102, in effect, tied together by tension means. Additional strength is thus obtained for the structure by this stressed construction. In installing two sheets of metal for the roof, this structure accommodates lateral movement of the sheets relative each other so that this joinder may be accomplished by a folding or hinging action as distinguished from a threading action in which wall 100 would slide longitudinally from end to end of wall 102 to accomplish joinder.

Mastic can be used in various of these joints, particularly in the area of the edges and wall joinder means 102—106 in order to make them weather-tight. It will be observed that the assembly is capable of application by a single man such as the trailer owner even though in many localities the installation will be done by a commercial company. Demounting of the parts can be accomplished quite rapidly and a minimum of space will be taken by the parts when knocked down, i. e., sheets 10 will nest together, and the other sections have a minimum length. It will be understood that this is an economical structure well adapted for its use and has so proved itself in installations already made.

It is believed that it will be clearly apparent from the above description and the disclosure in the drawings that the invention comprehends a novel construction of a fabricated sheet metal trailer awning.

Having thus disclosed the invention, I claim:

1. Securing means between a sheet and a supporting member therebelow, comprising: a J-shaped metal clip having a horizontal intermediate wall and a short upstanding wall rising from one edge of said intermediate wall and a longer upstanding wall rising from the opposite edge of said intermedaite wall, and an opening in said horizontal wall and a bolt positioned in said opening, the upper edge of said longer upstanding wall abutting the under surface of the sheet and the supporting member being engaged by the clip on the opposite side of the bolt from said longer upstanding wall, the upper end of said bolt being secured to said sheet and being tensed between said sheet and said horizontal wall pressing said supporting member against the under surface of said sheet.

2. A metal clip, comprising: a J-shaped metal strip having a horizontal intermediate wall and a short upstanding wall rising from one edge of said intermediate wall and a longer upstanding wall rising from the opposite edge of said intermediate wall, and an opening in said horizontal wall and a bolt positioned in said opening, whereby a sheet may be secured to a lower supporting member by having the upper edge of said longer upstanding wall abutting the under surface of the sheet and by having the supporting member engaged by the clip on the opposite side of the bolt from said longer upstanding wall and pressed against the under surface of said sheet by the tension of said bolt acting between said horizontal wall and said sheet.

3. A sheet metal awning for trailers, comprising: a series of elongated, corrugated thin metal sheet sections positioned side by side and joined together at their adjacent edges by having an upstanding wall on each adjacent section juxtaposed and abutting and a first of said walls having a flange extending laterally away from the other wall and the second wall having a flange overlying the first mentioned flange and terminating in a reverse bend generously receiving the distal edge of the first flange; means for attaching the rear ends of said sections to such trailer and a substantially-horizontal rod extending under the front ends of said sections for supporting the same, at least two upright columns adapted to rest on the ground and secured to said horizontal rod at their upper ends, a series of clips securing said rod to said sheet, said clips being J-shaped straps each having a long upright wall having its upper edge abutting the under surface of one of said sheets, having a horizontal wall extending laterally from said upright wall and terminating in a short upright wall thereby forming a seat for said horizontal rod on the horizontal wall and between said upright walls and bolt means positioned between said rod and said long upright wall and tying said horizontal wall to one of said sheets thereby pressing the upper surface of said rod on the under surface of said sheet.

4. The subject matter of claim 3 in which there is a gutter provided for the forward edge of said awning including an outer vertical wall joined by an inner horizontal wall terminating in a rising wall of less height than the said outer wall thereby forming a trough for collection of water located to receive water running off the forward ends of said sheet and said short rising wall having a flange extending inwardly parallel to the outer under surface of said sheet and pressed thereagainst by being positioned between that surface and said horizontal rod.

5. A sheet metal awning for trailers, comprising: a series of elongated, corrugated thin metal sheet sections positioned side by side and joined together at their adjacent edges by having an upstanding wall on each adjacent section juxtaposed and abutting and a first of said walls having a flange extending laterally away from the other wall and the second wall having a flange overlying the first mentioned flange and terminating in a reverse bend generously receiving the distal edge of the first flange; a substantially-horizontal rod extending under the front ends of said sections for supporting the same, a series of clips securing said rod to said sheet, at least two upright columns adapted to rest on the ground and secured to said horizontal rod at their upper ends, a rail to be secured to the trailer having an outwardly upwardly extending flange terminating in a reverse bend forming a downwardly bowed terminal edge, a second series of clips each having one vertical wall positioned with its upper edge abutting the under surface of the rear end of one of said sheets, having a horizontal wall extending from the lower edge of the vertical wall and a second upright wall extending from the opposite margin of said horizontal wall engaged in said reverse bend behind said terminal edge of said rail and pressing the rail against the lower surface of said sheet and tension means between said horizontal wall and said sheet for pressing said second clips into position.

6. In a metal roof, the improvement, comprising: a series of elongated corrugated metal sheet sections positioned side by side, adjacent sheet sections being hingedly joined together by an upstanding wall on each adjacent section and interengaging means on the walls engageable by a hinged folding action with the lower edges of said upstanding walls compressed together and with the upper edges connected together by tension means whereby in joinder the adjacent sections are biased by their upstanding walls to raise slightly in their centers, horizontal stringer means abutting the under surface of said sheet sections to which said sections are secured, the sheet sections on the end of the series having vertical walls on their end edges with inturned upper edges, a channel shaped valance member for each end section with one flange abutting the upper surface of said inturned upper edge and with its base wall abutting and secured to the outer surface of the vertical wall of the end section and the other flange of the valance member lying a substantial distance below the vertical wall.

7. A sheet metal awning comprising: a series of elongated metal sheet sections positioned side by side and having joinder means at their adjacent edges; means for attaching the rear ends of said sections to the supporting structure on which the awning is to be used, a substantially horizontal rod extending under the front ends of said sections for supporting the same, at least two upright columns adapted to rest on the ground and secured to said horizontal rod at their upper ends, a series of clamps securing said rod to said sheet, each clip being a J-shaped strap having a long upright wall having its upper edge abutting the under surface of one of said sheets, having a horizontal wall extending laterally from said upright wall and terminating in a short upright wall thereby forming a seat for said horizontal rod on the horizontal wall and between said upright walls and bolt means positioned between said rod and said long upright wall and tying said horizontal wall to one of said sheets thereby pressing the upper surface of said rod on the under surface of said sheet.

8. The subject matter of claim 7 in which there is a gutter provided for the forward edge of said awning including an outer vertical wall joined by an inner horizontal wall terminating in a rising wall thereby forming a trough located to receive water running off the forward ends of said sheet and said rising wall having a flange extending inwardly parallel to the under surface of said sheet and pressed thereagainst by being positioned between that surface and said horizontal rod.

9. A sheet metal awning for trailers, comprising: a series of elongated metal sheet sections positioned side by side and having joinder means at their adjacent edges, means for supporting the front ends of said sections; a rail to be secured to the trailer having an outwardly upwardly extending flange terminating in a reverse bend forming a downwardly bowed terminal edge, a series of clips each having one vertical wall positioned with its upper edge abutting the under surface of the rear end of one of said sheets, having a horizontal wall extending from the lower edge of the vertical wall and a second upright wall extending from the opposite margin of said horizontal wall engaged in said reverse bend behind said terminal edge of said rail and pressing the rail against the lower surface of said sheet and tension means between said horizontal wall and said sheet for pressing said clips into position.

10. In a metal roof, the improvement, comprising: sheet metal sections on the end margins of the roof having upright walls on their end edges with inturned upper edges, a channel shaped valance member for each end section with one flange abutting the upper surface of said inturned upper edge and with its base wall abutting and secured to the outer surface of the upright wall of the end section and the other flange of the valance member lying a substantial distance below the upright wall.

References Cited in the file of this patent

UNITED STATES PATENTS

| | | |
|---|---|---|
| 994,440 | Brunst | June 6, 1911 |
| 2,423,402 | Olsen | July 1, 1947 |
| 2,459,983 | Werner et al. | Jan. 25, 1949 |
| 2,594,131 | Davies | Apr. 22, 1952 |
| 2,618,820 | Struben et al. | Nov. 25, 1952 |
| 2,618,821 | Corn | Nov. 25, 1952 |